United States Patent
Miyazawa

(10) Patent No.: US 6,823,259 B2
(45) Date of Patent: Nov. 23, 2004

(54) NAVIGATION APPARATUS AND COMPUTER PROGRAM PRODUCT FOR NAVIGATION CONTROL

(75) Inventor: Hirohisa Miyazawa, Kanagawa (JP)

(73) Assignee: Xanavi Informatics Corporation, Kanagawa (JP)

( * ) Notice: Subject to any disclaimer, the term of this patent is extended or adjusted under 35 U.S.C. 154(b) by 0 days.

(21) Appl. No.: 10/417,165

(22) Filed: Apr. 17, 2003

(65) Prior Publication Data

US 2004/0024524 A1 Feb. 5, 2004

(30) Foreign Application Priority Data

Apr. 17, 2002 (JP) ....................................... 2002-114832

(51) Int. Cl.[7] ............................................. G01C 21/00
(52) U.S. Cl. ...................... 701/209; 340/988; 340/990; 701/205; 701/206; 701/26
(58) Field of Search ................................ 701/209, 200, 701/201, 205, 206, 207, 208, 210, 211, 25, 28; 73/178 R; 340/988, 990, 995.1, 995.14, 995.17, 995.19, 995.2, 995.24, 995.25, 995.27

(56) References Cited

U.S. PATENT DOCUMENTS

| | | | |
|---|---|---|---|
| 4,951,211 A | 8/1990 | De Villeroche | |
| 5,430,655 A | 7/1995 | Adachi | |
| 5,537,323 A | 7/1996 | Schulte | |
| 5,629,854 A | 5/1997 | Schulte | |
| 5,874,905 A * | 2/1999 | Nanba et al. | 340/995.2 |
| 5,884,217 A * | 3/1999 | Koyanagi | 701/208 |
| 6,349,259 B1 * | 2/2002 | Sato | 701/207 |
| 2003/0065446 A1 * | 4/2003 | Ootomo et al. | 702/5 |

* cited by examiner

*Primary Examiner*—Olga Hernandez
(74) *Attorney, Agent, or Firm*—Crowell & Moring LLP

(57) ABSTRACT

The navigation apparatus includes: a current position detection device that detects a current position; a display device; a storage device having stored therein position information related to points used as guidance points when providing route guidance; and a control device that controls the route guidance provided along a guided route which includes a plurality of predetermined guidance points based upon the current position detected by the position detection device and the position information related to the points stored in the storage device, wherein: as the current position approaches a first guidance point closest to the current position, the control device engages the display device to bring up display of an arrow indicating an angle corresponding to a direction to follow to advance toward a second guidance point after the first guidance point.

16 Claims, 8 Drawing Sheets

NAVIGATION APPARATUS AND COMPUTER PROGRAM PRODUCT FOR NAVIGATION CONTROL

INCORPORATION BY REFERENCE

The disclosure of the following priority application is herein incorporated by reference:

Japanese Patent Application No. 2002-114832 filed Apr. 17, 2002

BACKGROUND OF THE INVENTION

1. Field of the Invention

The present invention relates to a navigation apparatus and a computer program product for navigation control.

2. Description of the Related Art

There are car navigation apparatuses known in the related art that are equipped with functions for displaying a roadmap around the current vehicle position, for determining through an arithmetic operation a recommended route from the start point to the destination, for providing route guidance based upon the recommended route determined through the arithmetic operation and the like.

Such a car navigation apparatus displays the recommended route and the like on a roadmap displayed at a monitor. This allows the user to ascertain the current vehicle position and the recommended route in relation to the roadmap, affording great convenience.

However, there is a problem in that a huge volume of data must be handled and a great deal of time is required for the processing in order to display the roadmap. As a result, the car navigation apparatus requires a large storage capacity, a high-speed CPU and a high-performance display device, which leads to higher costs.

SUMMARY OF THE INVENTION

The present invention provides a low-cost navigation apparatus and a computer program product for navigation control that may be used to realize the low-cost navigation apparatus.

The navigation apparatus according to the present invention comprises: a current position detection device that detects a current position; a display device; a storage device having stored therein position information related to points used as guidance points when providing route guidance; and a control device that controls the route guidance provided along a guided route which includes a plurality of predetermined guidance points based upon the current position detected by the position detection device and the position information related to the points stored in the storage device, wherein: as the current position approaches a first guidance point closest to the current position, the control device engages the display device to bring up display of an arrow indicating an angle corresponding to a direction to follow to advance toward a second guidance point after the first guidance point.

In the navigation apparatus, it is preferred that the control device determines the direction to travel to advance toward the second guidance point through an arithmetic operation executed in reference to the first guidance point.

In the navigation apparatus, it is preferred that the control device determines the direction to travel to advance toward the second guidance point through an arithmetic operation executed in reference to the current position.

In the navigation apparatus, it is preferred that the control device does not display a roadmap at the display device.

In the navigation apparatus, it is preferred that the control device displays a straight arrow at the display device while the current position is still distanced from the next guidance point.

In the navigation apparatus, it is preferred that the control device displays the arrow as a bent arrow and if another road intersects the guided route between the current position and the first guidance point, the control device brings up a supplementary indicator on display corresponding to the intersecting road between an arrow tail and a bending point.

A computer-readable computer program product according to the present invention contains a navigation control program, with the navigation control program comprising: a current position detection instruction code for detecting a current position; a position information acquisition instruction code for obtaining position information related to points used as guidance points in route guidance; and a route guidance control instruction code for controlling the route guidance provided along a guided route that contains a plurality of predetermined guidance points based upon the current position detected in conformance to the current position detection instruction code and the position information related to the points obtained in conformance to the position information acquisition instruction code, wherein: in conformance to the route guidance control instruction code, control is implemented so that as the current position approaches the first guidance point closest to the current position, an arrow indicating an angle corresponding to a direction to travel to advance toward a second guidance point after the first guidance point is displayed at a display device.

In the computer program product, it is preferred that in conformance to the route guidance control instruction code in the navigation control program, control is implemented so as not to display a roadmap at the display device.

It is preferred that the computer program product is a recording medium having recorded therein the navigation control program or a carrier wave having the navigation control program embodied as a data signal therein.

DESCRIPTION OF THE PREFERRED EMBODIMENTS

First Embodiment

Figure 1:
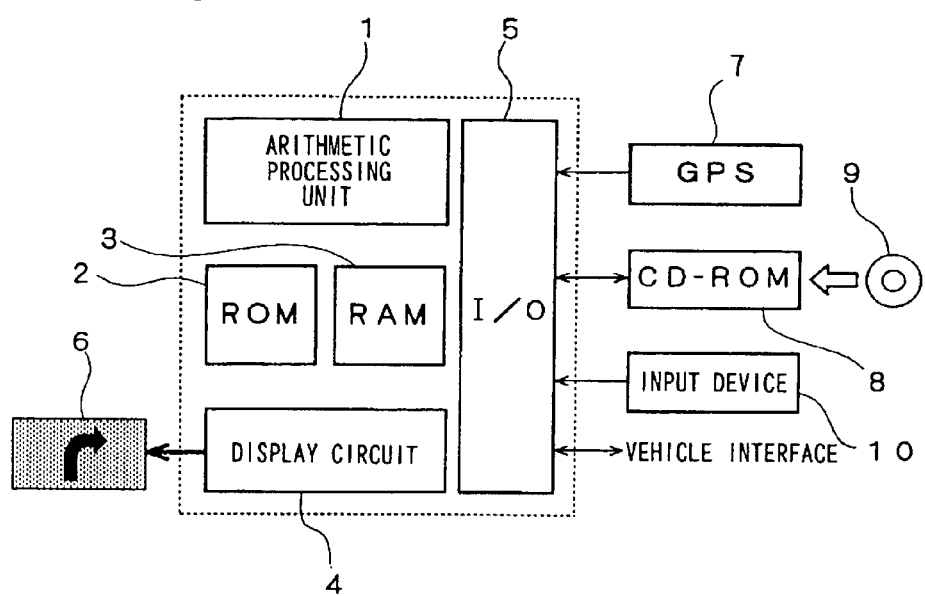
FIG. 1 is a block diagram of the car navigation apparatus according to a first embodiment.

FIG. 1 is a block diagram of the car navigation apparatus according to the embodiment. Reference numeral 1 indicates an arithmetic processing unit constituted of a microprocessor (CPU) and the like, reference numeral 2 indicates a ROM in which a control program and the like are stored, reference numeral 3 indicates RAM used as a work area for the arithmetic processing unit 1 and the like, reference numeral 4 indicates a display circuit that implements a display control and reference numeral 5 indicates an I/O device constituting an interface with an external apparatus. The arithmetic processing unit 1, the ROM 2, the RAM 3, the display circuit 4 and the I/O device 5 are connected via a bus (not shown).

Reference numeral 6 indicates a monitor used to display navigation information and the like, which is connected to the display circuit 4. A GPS device indicated by reference numeral 7, which detects the position of the vehicle based upon a GPS signal received from a GPS (global positioning system) satellite, is connected to the I/O device 5. A CD-ROM device indicated by reference numeral 8, which reads road data and the like from a CD-ROM 9, is connected to the I/O device 5. An input device indicated by reference numeral 10, which includes a joystick and various types of switches, is also connected to the I/O device 5.

The car navigation apparatus structured as described above determines through an arithmetical portion a recommended route from the start point to the destination (a route search) and provides route guidance, i.e., navigation, based upon the recommended route determined through the arithmetic operation. In the embodiment, route guidance is provided simply by displaying an arrow at the monitor 6 without displaying a roadmap. The route guidance (navigation) provided simply by displaying such an arrow is hereafter referred to as arrow navigation.

Figure 2:
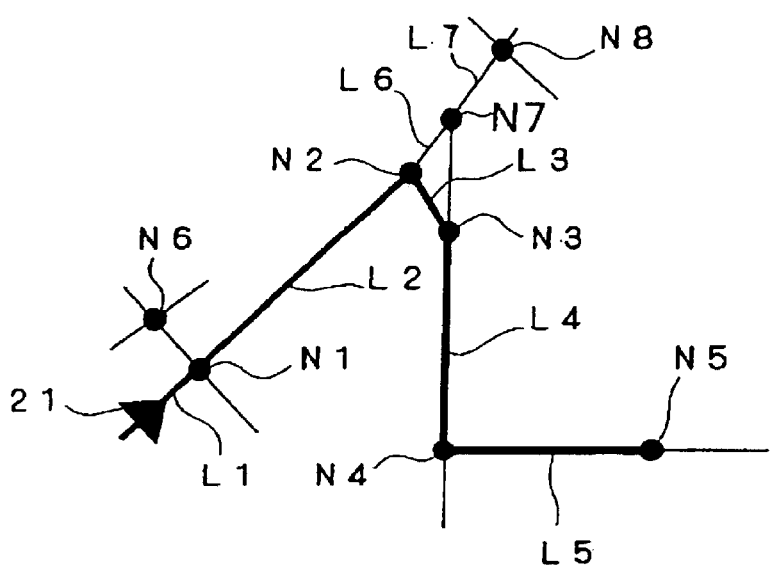
FIG. 2 shows a schematic map provided to facilitate an explanation of the arrow navigation.

In reference to FIGS. 2 and 3A–3D, the arrow navigation executed by the car navigation apparatus according to the first embodiment is explained. FIG. 2 shows a schematic map which is provided to facilitate the explanation of the arrow navigation. In the embodiment, roads are expressed based upon a concept that they are constituted of nodes, links and link strings. A node is equivalent to an intersection of roads or a branching point, whereas a link is equivalent to a road connecting two nodes. A link string is a plurality of successive links. For instance, National Highway No. 1 may be divided into a plurality of link strings with National Highway No. 1 extending from a given point to another point constituting a single link string. In the following explanation, intersections and branching points are simply referred to as nodes, and roads extending between intersections are simply referred to as links.

Road data are stored in the CD-ROM 9. The road data are constituted of node connection data and guidance data. The arithmetic processing unit 1 reads road data stored in the CD-ROM 9 via the CD-ROM device 8 and uses the road data to implement arrow navigation control. The road data do not include data necessary to display roadmaps.

Information on connections of the nodes described above (network information) is stored as the node connection data. For each node, the positional coordinates of the node and the node numbers assigned to nodes adjacent to the node are stored. Node numbers are assigned to individual nodes through a specific method. The node connection data that include the information on the connections between the individual nodes can be utilized for route search and arrow navigation guidance. The guidance data are constituted of intersection data and branching point data. Data such as the names of intersection and branching points are stored as the guidance data and the name of a specific intersection and the like can be displayed during the arrow navigation guidance by using the guidance data.

It is to be noted that the node connection data and the guidance data may be generated by culling the data available in an existing car navigation apparatus that displays roadmaps.

FIG. 2 shows a schematic map over a specific range constituted of nodes, links and link strings explained above. Reference numerals N1~N8 each indicate a node and reference numerals L1~L7 each indicate a link. If, for instance, the road corresponding to the links L1, L2, L6 and L7 is part of National Highway No. 1, the links L1, L2, L6 and L7 are part of a given link string. The current vehicle position (the vehicle position) is indicated with a triangle mark 21 and the recommended route determined through the arithmetic operation in the route search is indicated by the bold line. Namely, a vehicle 21 is about to pass through the node N1 and to take right turns at the nodes N2 and N3 and a left turn at N4 to reach the destination.

Figure 3A:
FIGS. 3A–3D present examples of arrows that may be used in the arrow navigation.

Next, the guidance provided by the car navigation apparatus through the recommended route shown in FIG. 2 in the embodiment is explained. While the vehicle 21 is traveling through the link L1 or the link L2, an arrow 31 shown in the FIG. 3A is displayed at the monitor 6. The arrow 31 is a simple upward pointing arrow. The arrow 31 pointing upward indicates that the vehicle should continue to drive straight ahead along the advancing direction. In other words, the arrow on display points upward at all times while the vehicle should continue to drive straight ahead, regardless of the advancing azimuth of the vehicle. Thus, the arrow 31 is continuously displayed since the vehicle advances from the link L1 to the link L2 both part of the same link string after passing through the node N1. It is to be noted that the current position of the vehicle 21 is calculated by the arithmetic processing unit 1 based upon the position signal provided by the GPS device 7.

Figure 3B:
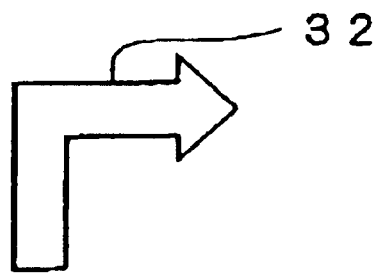

Subsequently, as the vehicle 21 approaches the node N2, an arrow 32 shown in FIG. 3B is brought up on display at the monitor 6. The arrow 32 indicates that the vehicle should take a 90° right turn at the next intersection. In this situation, the arrow 32 with a right-angle bend is displayed since the direction extending from the node N2 to the node N3 forms an angle of approximately 90° relative to the line connecting the current vehicle position with the node N2. A decision as to whether or not the vehicle 21 is approaching the node N2 is made based upon the current vehicle position and the positional coordinates of the node N2. The positional coordinates of each node are stored in the node connection data described earlier. For instance, the arrow 32 may be brought up on display to indicate that the vehicle 21 is approaching the node N2 when the current vehicle position is 100 m to the node N2. A value other than 100 m may be used for this purpose.

Figure 3C:
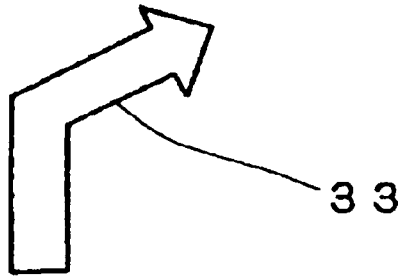

Immediately after the vehicle 21 makes the 90° right turn at the node N2, an arrow 33 shown in FIG. 3C is brought up on display at the monitor 6. The turn information for the next node N3 is immediately brought up on display since the distance between the node N2 and the node N3 is equal to or less than 100 m. Since the direction to the node N4 from the node N3 extends at an angle of approximately 45° to the right relative to the line connecting the current vehicle position to the node N3, the arrow 33, too, is bent at a 45° angle to the right.

After the vehicle 21 makes the 45° right turn at the node N3 to enter the link L4, the arrow 31 shown in FIG. 3A is brought up on display again at the monitor 6, since the vehicle needs to advance straight ahead through the link L4 for a while. When the vehicle position is 100 m from the node N4, the display at the monitor 6 is switched to the arrow 34 shown in FIG. 3D. The arrow 34 indicates that the vehicle should make a 90° left turn at the next intersection. The arrow 34 indicating a 90° left turn is brought up on display at this point since direction to the node N5 from the node N4 extends at an angle of approximately 90° relative to the line connecting the current vehicle position to the node N4.

It is to be noted that the recommended route is determined in advance through an arithmetic operation by the arithmetic processing unit 1 by using the node connection data, based upon the current vehicle position and destination information input through the input device 10. This arithmetic operation should be executed by adopting a method of the known art such as the Dykstra method. Alternatively, a recommended route can be determined through an arithmetic operation executed at another server or the like and transmitted through a communication to the car navigation apparatus. For instance, a port to which a portable telephone can be connected may be provided at the I/O device 5 so that data related to the recommended route determined through an arithmetic operation executed at an information provider center connected via the portable telephone may be obtained. It is to be noted that upon ascertaining that the vehicle position has deviated from the recommended route, the car navigation apparatus executes a route search again to determine the route from the updated current position to the destination.

Figure 4:
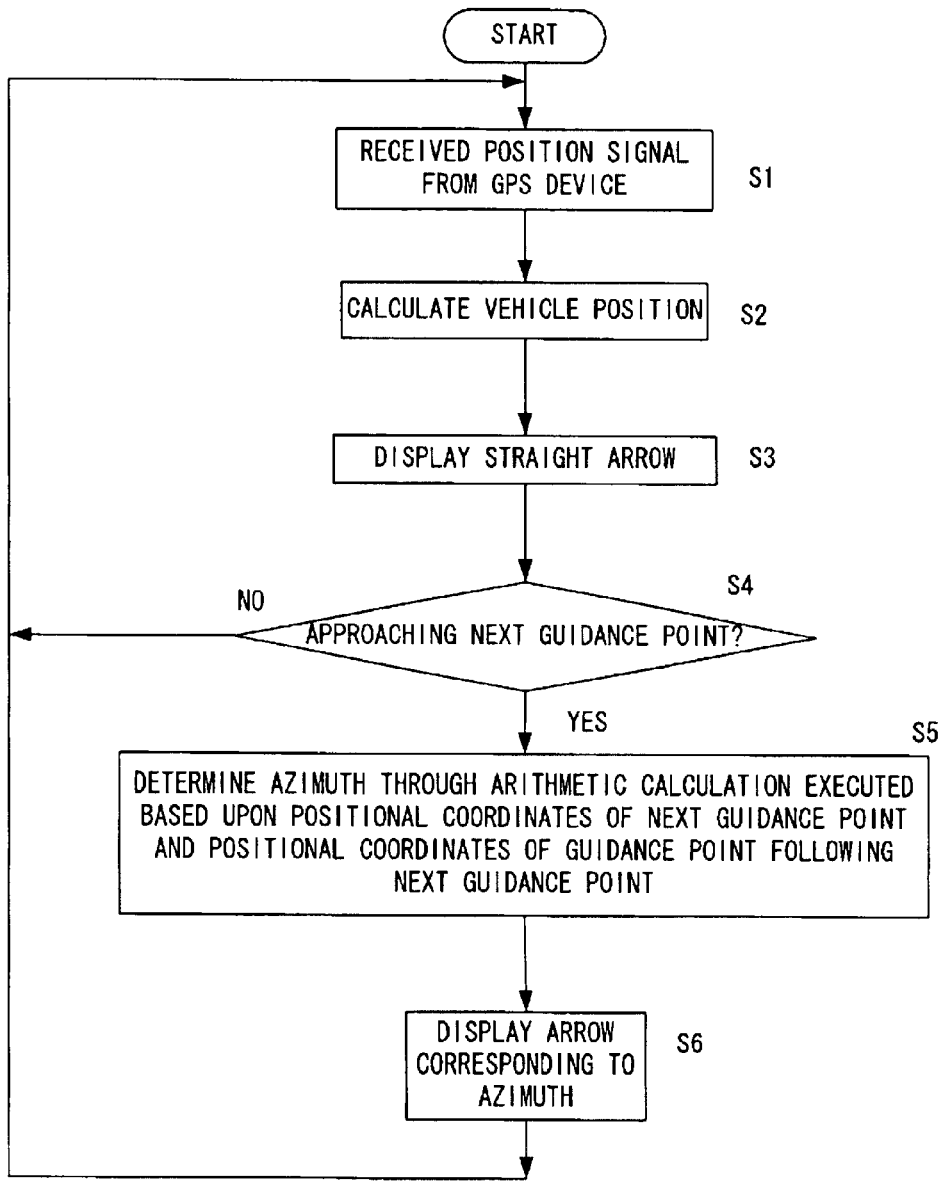
FIG. 4 presents a flowchart of the basic control of the arrow navigation executed at the arithmetic processing unit.

Next, the basic control flow of the arrow navigation described above is explained. FIG. 4 presents a flowchart of the basic control of the arrow navigation executed by the arithmetic processing unit 1. It is assumed that the recommended route has been determined through an arithmetic operation in advance and the route guidance has already started. The recommended route is constituted of a plurality of successive guidance points.

In step S1, a position signal is received from the GPS device 7. In step S2, the position of the vehicle 21 is calculated based upon the position signal obtained in step S1 and the node connection data. In step S3, the straight arrow (see FIG. 3A) is brought up for initial display. In step S4, a decision is made as to whether or not the vehicle is approaching the next guidance point. Namely, a decision is made as to whether or not the current vehicle position is 100 m or less to the next guidance point. If it is decided in step S4 that the vehicle has not yet moved close to the next guidance point, the operation returns to step S1 to execute the processing repeatedly. If, on the other hand, it is decided in step S4 that the vehicle has moved close to the next guidance point, the operation proceeds to step S5.

In step S5, the azimuth is determined through an arithmetic operation executed based upon the positional coordinates of the next guidance point and the positional coordinates of the guidance point after the next guidance point. For instance, if it is decided that the vehicle has entered the 100 m range to the node N2 while the vehicle 21 is driving through the link L2 in FIG. 2, the azimuth is calculated in step S5. The azimuth is calculated as the angle formed by the line connecting the current position of the vehicle 21 to the node N2 and the line connecting the node N2 to the node N3. In other words, the angle formed by the azimuth of the vehicle advancing to the node N2 and the azimuth at which the vehicle advances after departing the node N2 is calculated in reference to the node N2. It is to be noted that instead of the line connecting the current position of the vehicle 21 to the node N2, the line connecting the guidance point (not shown) preceding the node N2 to the node N2 may be used.

Figure 3D:
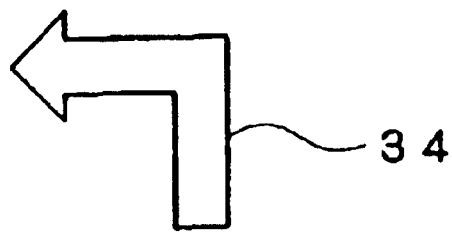

In step S6, an arrow which is bent at an angle corresponding to the azimuth calculated in step S5 is brought up on display. In the example presented in FIG. 2, the arrow shown in FIG. 3B is displayed as the vehicle approaches the node N2, the arrow shown in FIG. 3C is displayed as the vehicle approaches the node N3 and the arrow shown in FIG. 3D is displayed as the vehicle approaches the node N4. Since the display at the monitor 6 adopts the bit map method, the arrow on display can indicate a turn at any angle.

As explained above, the car navigation apparatus in the first embodiment displays the arrow indicating the direction along which the vehicle 21 should advance without displaying a roadmap at the monitor 6 when providing route guidance. As a result, the following advantages are achieved. An inexpensive display device can be used as the monitor 6. It is not necessary to prepare and store a large volume of roadmap display data. The RAM 3 does not need to have a large capacity either. The CPU constituting the arithmetic processing unit 1 does not need to be an expensive high-speed CPU. The physical size of the car navigation apparatus can be reduced. The control program can be prepared with ease and the processing speed can be raised. Since the structure of the hardware and the algorithm of the software are both simplified, the reliability improves. In short, a low-cost, compact, high-speed and highly reliable car navigation apparatus is realized.

Second Embodiment

Figure 5A:
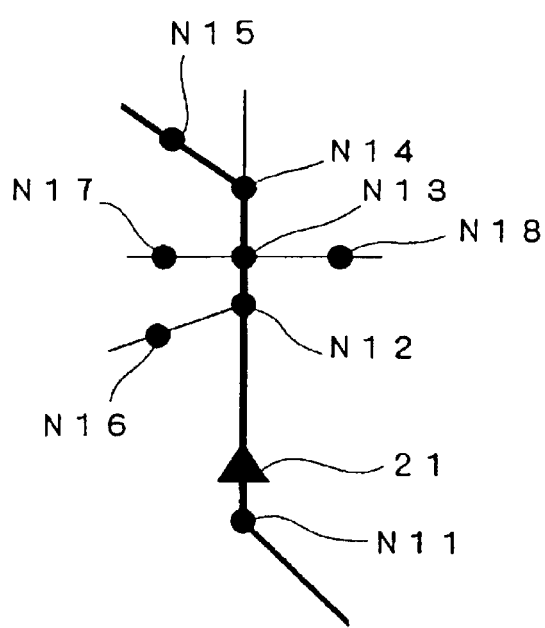
FIGS. 5A and 5B illustrate how the arrow navigation is executed in a second embodiment.
Figure 5B:
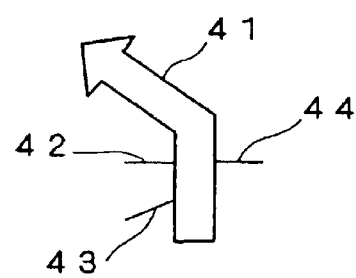

In the car navigation apparatus in the second embodiment, the display of the arrows in FIGS. 3A–3D achieved in the car navigation apparatus in the first embodiment is replaced by arrow display such as those shown in FIGS. 5A and 5B. Since other details are identical to those of the first embodiment, their explanation is omitted.

FIG. 5A shows a schematic map over a specific range. The recommended route that passes through nodes N11, N12, N13, N14 and N15 is indicated by the solid line. In addition, other roads intersect the recommended route, from nodes N16, N17 and N18. In the example presented in FIG. 5A, guidance points are the nodes N11, N14 and N15. As the vehicle 21 approaches the node N14 which is a guidance point, an arrow 41 shown in FIG. 5B is brought up on display at the monitor 6.

The arrow 41 includes supplementary indicators 42–44 presented in the form of thin lines. The supplementary indicator 42 represents the road extending between the node N13 and the node N17, the supplementary indicator 43 represents the road extending between the node N12 and the node N16 and supplementary indicator 44 represents the road extending between the node N13 and the node N18. The angle at which the arrow 41 bends is determined through an arithmetic calculation as in the first embodiment. The angles of the supplementary indicators 42–44, too, can be calculated based upon the positional coordinates of the individual nodes.

Since the user (driver) is informed that the recommended route is intersected by two roads before the vehicle reaches the next guidance point in this manner, even more fail-safe route guidance is provided.

Third Embodiment

In the first embodiment, the angle at which the arrow should bend is calculated in reference to the next guidance point. In the third embodiment, on the other hand, the angle to which the arrow bends is determined through an arithmetic calculation executed in reference to the current vehicle position. Since other details are identical to those of the first embodiment, their explanation is omitted.

Figure 6:
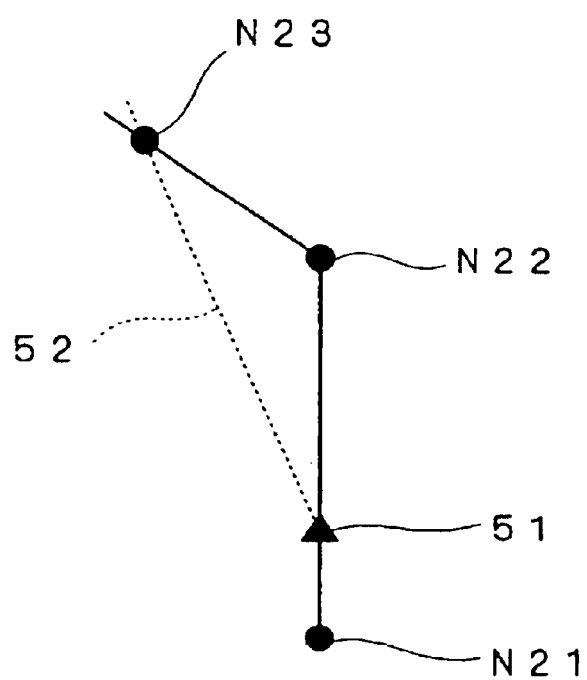
FIG. 6 illustrates the concept of the arrow navigation adopted in a third embodiment.

FIG. 6 illustrates the concept of the third embodiment. It is assumed that the vehicle advances from a node N21 to a node N22 and then to a node N23 on the recommended route. In the third embodiment, the direction to which a vehicle 51 should advance is calculated as the angle formed by the line connecting the current position of the vehicle 51 to the positional coordinates of the guidance point that the vehicle will reach after passing through the next guidance point (the dotted line 52 in FIG. 6) and the direction along which the vehicle 51 is advancing. As the vehicle 51 approaches the node N22, an arrow bent to the left (not shown) which is similar to the arrow 41 shown in FIG. 5B is brought up on display. The degree to which this arrow is bent gradually changes as the vehicle 51 moves closer to the node N22. When the vehicle finally reaches the node N22, the angle at which the arrow bends matches the angle formed by the direction along which the vehicle has been advancing and the direction along which the recommended route extends from the node N22 to the node N23. In other words, when a bent arrow is brought up on display, the direction indicated by the arrow always matches the direction of the guidance point that comes immediately after the next guidance point from the current vehicle position.

Figure 7:
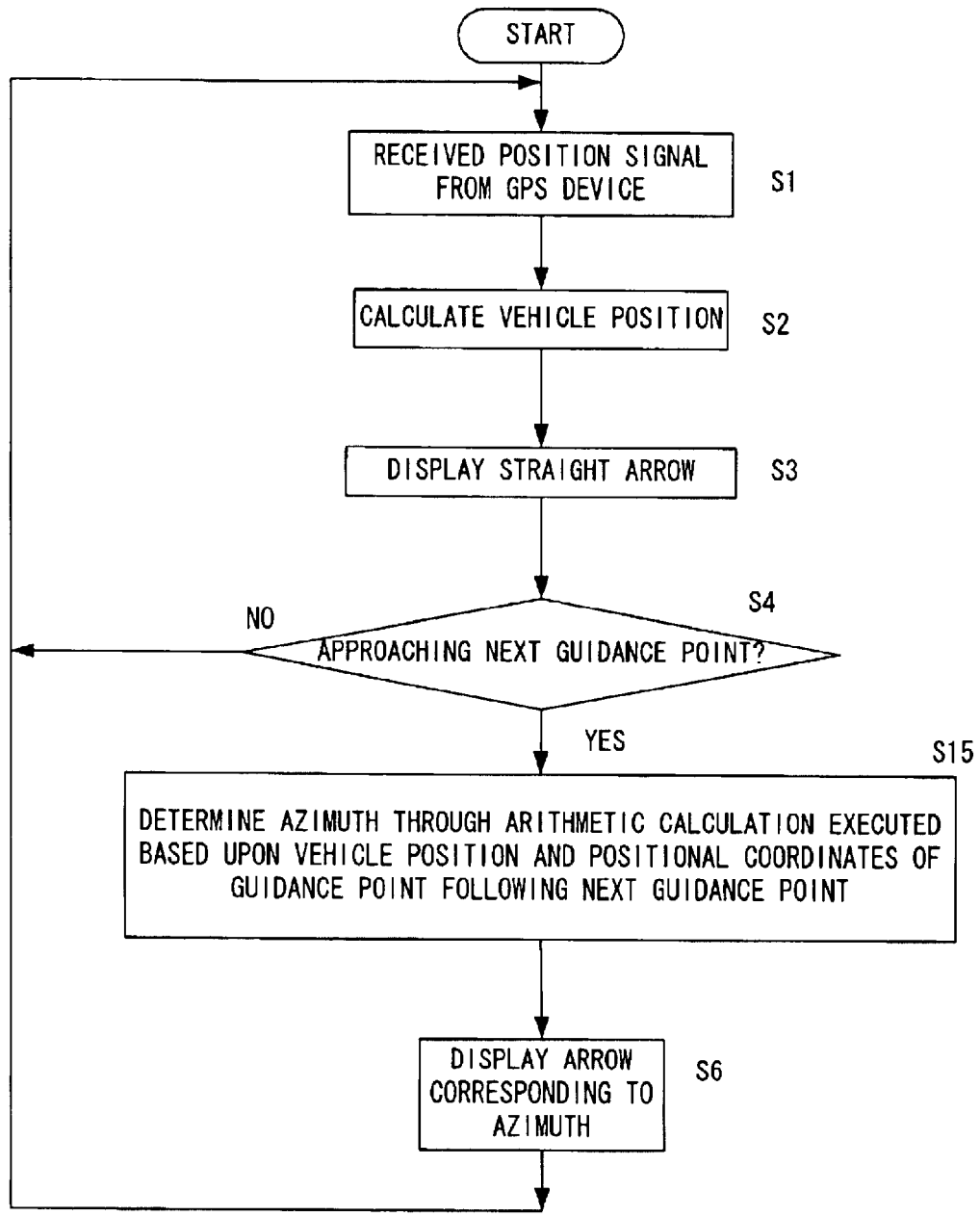
FIG. 7 presents a flowchart of the basic control of the arrow navigation executed at the arithmetic processing unit in the third embodiment.

FIG. 7 presents a flowchart of the basic control of the arrow navigation executed by the arithmetic processing unit 1 in the third embodiment. This flowchart corresponds to that presented in FIG. 4 in reference to which the first embodiment has been explained, and differs from FIG. 4 only in the processing executed in step S15. For this reason, the explanation focuses on the processing executed in step S15.

In step S15, the angle formed by the line connecting the current vehicle position calculated in step S2 to the guidance point which comes immediately after the next guidance point and the direction along which the vehicle 51 is advancing is calculated. In step S6, an arrow which is bent at an angle corresponding to the azimuth calculated in step S15 is brought up on display.

Thus, the route guidance is provided while displaying the direction along which the vehicle should be advancing at all times. This feature also proves useful when the driver is driving the vehicle on a road adjacent to the recommended route by mistake. Namely, even if the vehicle is running on a road adjacent to the recommended route and the car navigation apparatus fails to ascertain that the vehicle is running on the wrong road which is within the error range of the position detection executed by the GPS device 7, the direction along which the vehicle should advance on the recommended route relative to the vehicle position is displayed at all times. Thus, the correct azimuth on which the vehicle should advance relative to the current vehicle position is on display at all times. This enables the vehicle to ultimately return to the original recommended route. If the vehicle on the wrong road moves further away from the recommended route, the car navigation apparatus is bound to detect the error based upon the current vehicle position information and, accordingly, it executes a route search from the vehicle position at the time of the error detection to the destination so as to guide the vehicle to the destination.

It is to be noted that the description "only an arrow is brought up on display at the monitor 6" in the explanation of the embodiments described above means that no roadmap is brought on the display. Strictly speaking, simple information other than the arrow is also displayed in the embodiments. For instance, the names of intersections and the like may be displayed based upon the guidance data. Furthermore, vocal route guidance may be provided in addition to the arrow display.

Also, while an explanation is given above in reference to the embodiments on an example in which road data are stored based upon the concept that roads are constituted of nodes, links and link strings, the present invention is not limited to this example. Namely, the road data may assume any form as long as they provide connection information (network information) indicating how intersections, branching points and the like are connected.

In addition, while an explanation is given above in reference to the embodiments on an example in which the present invention is adopted in a car navigation apparatus, the present invention is not to this example. For instance, the present invention may be adopted in a portable navigation apparatus or it may be adopted in navigation achieved by using a portable telephone.

Furthermore, while an explanation is given above in reference to the embodiments on an example in which the control program executed by the arithmetic processing unit 1 of the car navigation apparatus is stored in the ROM 2, the present invention is not limited to this example. The control program and the installation program used to install the control program may be provided in a recording medium such as the CD-ROM 9.

Figure 8:
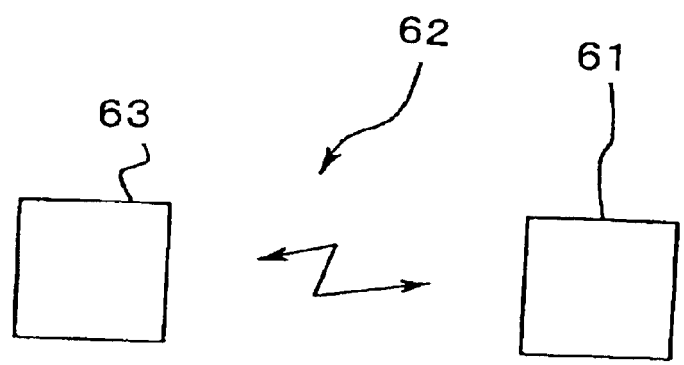
FIG. 8 shows how the program may be provided via a transmission medium.

Moreover, these programs may be provided via a transmission medium such as a communication line, a typical example of which is the Internet. Namely, the programs may be converted to and transmitted as signals on a carrier wave that carries a transmission medium. FIG. 8 shows how this may be achieved. A car navigation apparatus 61, which is the car navigation apparatus explained earlier, can be connected to a communication line 62. A computer 63 is a server computer that provides the control program stored therein for the car navigation apparatus 61. The communication line 62 may be a communication line used for Internet communication or personal computer communication, or it may be a dedicated communication line. The communication line 62 may be a wired telephone line, a wireless telephone line for portable telephones or the like. Thus, the program can be distributed as a computer-readable computer program product adopting any of various modes including a recording medium and a carrier wave.

It is to be noted that a car navigation apparatus may be achieved by executing the control program described above on a personal computer. In such a case, the GPS device 7 and the like may be connected to a specific I/O port and the like of the personal computer. In addition, the present invention may be adopted to achieve a navigation function by utilizing a portable phone or a PDA (personal digital assistant).

The above described embodiments are examples and various modifications can be made without departing from the spirit and scope of the invention.

What is claimed is:

1. A navigation apparatus comprising:
   a current position detection device that detects a current position;
   a display device;
   a storage device having stored therein position information related to points used as guidance points when providing route guidance; and
   a control device that controls the route guidance provided along a guided route which includes a plurality of predetermined guidance points based upon the current position detected by the position detection device and the position information related to the points stored in the storage device, wherein:
   as the current position approaches a first guidance point closest to the current position, the control device calculates an angle formed by a direction from the current position to the first guidance point and a direction from the first guidance point to a second guidance point following the first guidance point, and displays an arrow bending according to the calculated angle on the display device.

2. A navigation apparatus comprising:

a current position detection device that detects a current position of a vehicle;

a display device;

a storage device having stored therein position information related to points used as guidance points when providing route guidance; and a control device that controls the route guidance provided alone a guided route which includes a plurality of predetermined guidance points based upon the current position detected by the position detection device and the position information related to the points stored in the storage device, wherein as the current position approaches a first guidance point closest to the current position, the control device calculates an angle formed by a direction from the current position to a second guidance point following the first guidance point and a direction alone which the vehicle is advancing, and displays an arrow bending according to the calculated angle on the display device.

3. A navigation apparatus according to claim 1, wherein:

the control device does not display a roadmap at the display device.

4. A navigation apparatus according to claim 2, wherein:

the control device does not display a roadmap at the display device.

5. A navigation apparatus according to claim 1, wherein:

the control device displays a straight arrow at the display device while the current position is still distanced from the next guidance point.

6. A navigation apparatus according to claim 1, wherein:

if another road intersects the guided route between the current position and the first guidance point, the control device brings up a supplementary indicator on display corresponding to the intersecting road between an arrow tail and a bending point.

7. A computer-readable computer program product containing a navigation control program, the navigation control program comprising:

a current position detection instruction code for detecting a current position;

a position information acquisition instruction code for obtaining position information related to points used as guidance points in route guidance; and a route guidance control instruction code for controlling the route guidance provided along a guided route that contains a plurality of predetermined guidance points based upon the current position detected in conformance to the current position detection instruction code and the position information related to the points obtained in conformance to the position information acquisition instruction code, wherein:

in conformance to the route guidance control instruction code, control is implemented so that as the current position approaches the first guidance point closest to the current position, an angle formed by a direction from the current position to the first guidance point and a direction from the first guidance point to a second guidance point following the first guidance point is calculated, and an arrow bending according to the calculated angle is displayed at a display device.

8. A computer program product according to claim 7, wherein:

in conformance to the route guidance control instruction code in the navigation control program, control is implemented so as not to display a roadmap at the display device.

9. A computer program product according to claim 7, which is a recording medium having recorded therein the navigation control program.

10. A computer program product according to claim 7, which is a carrier wave having the navigation control program embodied as a data signal therein.

11. A navigation apparatus according to claim 2, wherein:

the control device displays a straight arrow at the display device while the current position is still distanced from the next guidance point.

12. A navigation apparatus according to claim 2, wherein:

if another road intersects the guided route between the current position and the first guidance point, the control device brings up a supplementary indicator on display corresponding to the intersecting road between an arrow tail and a bending point.

13. A computer-readable computer program product containing a navigation control program, the navigation control program comprising:

a current position detection instruction code for detecting a current position of a vehicle;

a position information acquisition instruction code for obtaining position information related to points used as guidance points in route guidance; and a route guidance control instruction code for controlling the route guidance provided along a guided route that contains a plurality of predetermined guidance points based upon the current position detected in conformance to the current position detection instruction code and the position information related to the points obtained in conformance to the position information acquisition instruction code, wherein:

in conformance to the route guidance control instruction code, control is implemented so that as the current position approaches the first guidance point closest to the current position, an angle formed by a direction from the current position to a second guidance point following the first guidance point and a direction along which the vehicle is advancing is calculated, and an arrow bending according to the calculated angle is displayed at a display device.

14. A computer program product according to claim 13, wherein:

in conformance to the route guidance control instruction code in the navigation control program, control is implemented so as not to display a roadmap at the display device.

15. A computer program product according to claim 13, which is a recording medium having recorded therein the navigation control program.

16. A computer program according to claim 13, which is a carrier wave having the navigation control program embodied as a data signal therein.

* * * * *